United States Patent [19]

Eaton et al.

[11] Patent Number: 5,682,147
[45] Date of Patent: Oct. 28, 1997

[54] METHOD AND APPARATUS FOR SELECTING A RECEIVE FREQUENCY IN A COMMUNICATION RECEIVER

[75] Inventors: Eric Thomas Eaton, Lake Worth; David Frank Willard, Plantation; Barbara Diaz Laflin, Ocean Ridge; Mark H. Aronson, Boynton Beach, all of Fla.

[73] Assignee: Motorola, Inc., Schaumburg, Ill.

[21] Appl. No.: 421,731

[22] Filed: Apr. 13, 1995

Related U.S. Application Data

[63] Continuation-in-part of Ser. No. 378,136, Jan. 24, 1995, Pat. No. 5,625,351.

[51] Int. Cl.⁶ ................................................ H04Q 7/18
[52] U.S. Cl. ........................ 340/825.03; 455/186.1; 340/311.1; 340/825.44; 340/825.47
[58] Field of Search ..................... 455/186.1, 38.2, 455/57.1; 340/22, 37, 311.1, 825.44, 825.47, 825.52, 825.68, 825.69, 825.03; 379/56, 57, 59

[56] References Cited

U.S. PATENT DOCUMENTS

| | | |
|---|---|---|
| 4,644,347 | 2/1987 | Lucas . |
| 4,713,808 | 12/1987 | Gaskill et al. . |
| 4,718,109 | 1/1988 | Breeden et al. ............ 340/825.44 X |
| 4,914,649 | 4/1990 | Schwendeman et al. . |
| 4,977,611 | 12/1990 | Mary . |
| 5,077,758 | 12/1991 | DeLuca et al. ...................... 375/95 |
| 5,128,665 | 7/1992 | DeLuca et al. ............... 340/825.47 |
| 5,136,719 | 8/1992 | Gaskill . |
| 5,168,271 | 12/1992 | Hoff . |
| 5,168,493 | 12/1992 | Nelson et al. ........... 340/825.44 X |
| 5,187,470 | 2/1993 | King et al. ................. 340/825.44 |
| 5,189,413 | 2/1993 | Gaskill et al. . |
| 5,196,842 | 3/1993 | Gomez et al. ............. 340/825.44 |
| 5,206,855 | 4/1993 | Schwendeman et al. .... 340/825.44 X |
| 5,254,986 | 10/1993 | DeLuca et al. ............. 340/825.44 |

Primary Examiner—Michael Horabik
Assistant Examiner—William H. Wilson, Jr.
Attorney, Agent, or Firm—James A. Lamb

[57] ABSTRACT

A method and apparatus select a receive frequency of a receiver (400) in a system having coverage areas divided into zones. A primary scan list is stored in the receiver (400) and contains coverage area identification parameters. The list is initially ordered from a most frequented coverage area at the top to a least frequented coverage area at the bottom. The parameters can include a coverage area identifier and a zone identifier, and at least one corresponding frequency identifier. A frequency identifier is chosen (604) from the top of the list and the receiver (400) is tuned to the receive frequency identified thereby. Baud rate detection is performed (608) and, in response to finding a predetermined baud rate, a received coverage area identifier and/or a received zone identifier is decoded (612). If the received identifier matches a corresponding parameter stored in the receiver, the receiver (400) is locked (904) to a signal on the receive frequency.

20 Claims, 14 Drawing Sheets

FIG. 4

1 2 3 4 5 6 7 . . . . . . . . . 21 . . . . . . . . . 31 32
x0 x1 x2 x3 c0 c1 c2 c3 f0 f1 f2 f3 f4 f5 f6 n0 r0 t0 t1 t2 t3 p p p p p p p p p
INFORMATION | PARITY | CK
0 0 1 1 1 0 0 0 1 1 1 0 0 0 0 0 0 1

FIG. 5

1 2 3 4 5 6 7 . . . . . . . . . 21 . . . . . . . . . 31 32
x0 x1 x2 x3 P0 P1 P2 P3 a0 a1 v0 v1 v2 v3 v4 v5 c0 c1 m0 m1 m2 p p p p p p p
INFORMATION | PARITY | CK
0 1 0 1 0 1 0 0 1 1 1 1 0 0 1 1

FIG. 6

1 2 3 4 5 6 7 . . . . . . . . . 21 . . . . . . . . . 31 32
x0 x1 x2 x3 f0 f1 f2 s0 s1 s2 s3 s4 s5 s6 s7 s8 s9 s10 s11 s12 s13 p p p p p p p
INFORMATION | PARITY | CK
1 1 0 1 1 0 0 1 0 1 0 0 1 1 1 0 0 1 1

| FRAME | A | B | C | D |
|---|---|---|---|---|
| 0 | LID1  T<br>LID2 | T | T | T |
| 1 |  | LID1<br>LID2 |  |  |
| 2 |  |  | LID1<br>LID2 |  |
| 3 |  |  |  | LID1<br>LID2 |
| 4 | LID1 |  |  |  |
| 5 |  | LID1 |  |  |
| 6 |  |  | LID1 |  |
| 7 |  |  |  | LID1 |
| 8 | LID1 |  |  |  |
| 9 |  | LID1 |  |  |
| 10 |  |  | LID1 |  |
| 11 |  |  |  | LID1 |
| 12 | LID1 |  |  |  |
| 13 |  | LID1 |  |  |
| 14 |  |  | LID1 |  |
| 15 |  |  |  | LID1 |
| 16 | LID1 |  |  |  |
| 17 |  | LID1 |  |  |
| 18 |  |  | LID1 |  |
| 19 |  |  |  | LID1 |
| 20 | LID1 |  |  |  |
| ⋮ |  |  |  |  |
| 127 |  |  |  | LID1 |

*FIG. 11*

| FRAME | A | B | C | D |
|---|---|---|---|---|
| 0 | LID1 T<br>LID2 N1 | T | T | T |
| 1 | | LID1<br>LID2 N2 | | |
| 2 | | | LID1<br>LID2 N3 | |
| 3 | | | | LID1<br>LID2 N4 |
| 4 | LID1 N5 | | | |
| 5 | | LID1 N6 | | |
| 6 | | | LID1 N7 | |
| 7 | | | | LID1 N8 |
| 8 | LID1 N9 | | | |
| 9 | | LID1 N10 | | |
| 10 | | | LID1 N1 | |
| 11 | | | | LID1 N2 |
| 12 | LID1 N3 | | | |
| 13 | | LID1 N4 | | |
| 14 | | | LID1 N5 | |
| 15 | | | | LID1 N6 |
| 16 | LID1 N7 | | | |
| 17 | | LID1 N8 | | |
| 18 | | | LID1 N9 | |
| 19 | | | | LID1 N10 |
| ⋮ | LID1 N1 | | | |
| 127 | | | | LID1 |

*FIG. 12*

| FRAME | A | B | C | D |
|---|---|---|---|---|
| 0 | LID1  T<br>LID2  N1 | T | T | T |
| 1 |  | LID1<br>LID2 |  |  |
| 2 |  |  | LID1<br>LID2 |  |
| 3 |  |  |  | LID1<br>LID2  N4 |
| 4 | LID1<br>    N5 |  |  |  |
| 5 |  | LID1<br>N7  N6 |  |  |
| 6 |  |  | LID1 |  |
| 7 |  |  |  | LID1  N8 |
| 8 | LID1  N9 |  |  |  |
| 9 |  | LID1  N10 |  |  |
| 10 |  |  | LID1 |  |
| 11 |  |  |  | LID1 |
| 12 | LID1 |  |  |  |
| 13 |  | LID1<br>    N2 |  |  |
| 14 |  |  | LID1 |  |
| 15 |  |  |  | LID1<br>    N3 |
| 16 | LID1 |  |  |  |
| 17 |  | LID1 |  |  |
| 18 |  |  | LID1 |  |
| 19 |  |  |  | LID1 |
| • | LID1 |  |  |  |
| • |  |  |  |  |
| • |  |  |  |  |
| • |  |  |  |  |
| 127 |  |  |  | LID1 |

*FIG. 13*

| ROM | |
|---|---|
| | 450 |
| INITIALIZATION | 451 |
| FIRST TUNER | 452 |
| BAUD RATE DETECTION | 453 |
| PARAMETER DECODER | 454 |
| FIRST LOCK | 455 |
| SELECTOR | 456 |
| REPEAT | 457 |
| REDO | 458 |
| TERMINATOR | 459 |
| ZONE IDENTIFIER LOCK | 460 |
| ZONE IDENTIFIER AVAILABILITY | 461 |
| PERIODIC CHECK | 462 |
| TEST FREQUENCY BAUD RATE DETECTION | 463 |
| ZONE IDENTIFIER DECODER | 464 |
| ZONE IDENTIFIER MATCH | 465 |
| MOVER | 466 |
| SECOND LOCK | 467 |
| RANDOM SEARCH DETERMINER | 468 |
| PROMPTER | 469 |
| CONTROL RESPONDER | 470 |
| CANDIDATE CHANNEL LIST FORM | 471 |
| TIME SYNCHRONIZATION CHECKER | 472 |
| WINDOW ADJUSTMENT | 473 |
| ROAMING INFORMATION DETERMINER | 474 |
| SECOND TUNER | 475 |
| ROAMING INFORMATION DECODER | 476 |
| CHANNEL FREQUENCY REMOVAL | 477 |
| RESYNCHRONIZATION | 478 |
| COVERAGE AREA IDENTIFIER DECODER | 479 |
| COMPARATOR | 480 |
| PLACEMENT | |

METHOD AND APPARATUS FOR SELECTING A RECEIVE FREQUENCY IN A COMMUNICATION RECEIVER

This application is a continuation-in-part of application Ser. No. 08/378,136, filed Jan. 24, 1995, entitled "Messaging System Having Roaming Capability," now U.S. Pat. No. 5,625,351.

FIELD OF THE INVENTION

This invention relates in general to radio communication systems, and more specifically to a method and apparatus for selecting a receive frequency in a communication receiver.

BACKGROUND OF THE INVENTION

Communication systems that operate over a wide area, or even globally, are becoming available. Such systems operate on numerous radio communication frequencies and require that a communication receiver utilized therewith be capable of scanning the numerous frequencies in order to locate a frequency having a message for the communication receiver. Frequency scanning, if performed haphazardly, can require so much time that messages are missed and battery life is shortened.

Thus, what is needed is a method and apparatus that provides efficient channel selection in a roaming communication receiver. Channel scanning in the communication receiver preferably should be performed intelligently, such that the channels most likely to contain a message for the communication receiver are scanned before less likely channels.

BRIEF DESCRIPTION OF THE DRAWINGS

FIG. 4 illustrates a structure of a frame information word according to the present invention.

FIGS. 5 and 6 illustrate structures of block information words in which single simulcast identification (SSID) information is coded.

FIG. 11 is frame diagram illustrating the placement of the SSID and time information in accordance with the present invention.

FIG. 12 is a frame diagram illustrating a first placement configuration of the NRI information in accordance with the present invention.

FIG. 13 is a frame diagram illustrating a second placement configuration of the NRI information in accordance with the present invention.

FIG. 17 is a firmware diagram depicting firmware elements in the communication receiver in accordance with the present invention.

DETAILED DESCRIPTION OF THE DRAWINGS

The present invention is directed to selecting a receive frequency in a communication receiver for use in a communication system capable of servicing or transmitting messages to receivers roaming between coverage areas. An example of a selective call signaling system to which the present invention relates is disclosed in commonly assigned U.S. Pat. No. 5,128,665. The entire text and drawings of U.S. Pat. No. 5,128,665 are herein incorporated by reference. The present invention, however, is not in any way limited to a particular type of signaling protocol and has utility in many types of communication systems, a paging or messaging system being only an example.

Figure 1:
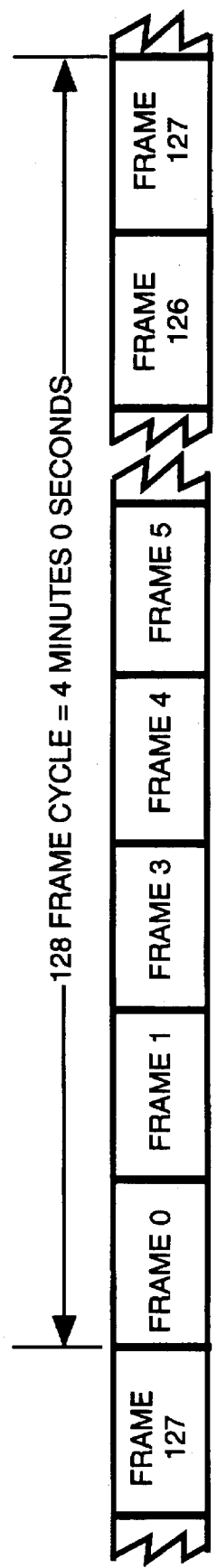
FIGS. 1–3 are timing diagrams illustrating a signaling protocol in accordance with the present invention.
Figure 2:
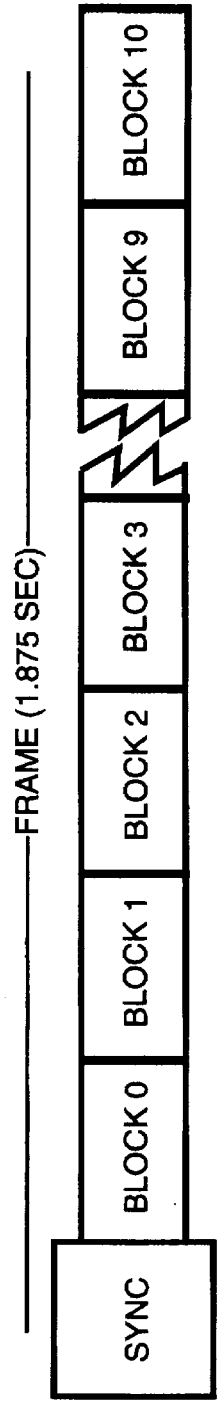
Figure 3:
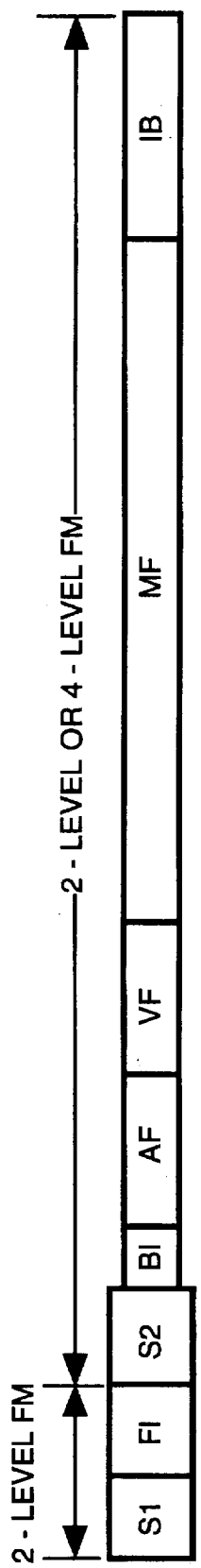

Referring to FIGS. 1–3, an example of a selective call communication system to which the present invention pertains is shown. The signaling system shown comprises 128 frames, with each frame numbered 0 to 127. The frames are transmitted at 32 frames per minute, and thus a full 128 frame cycle lasts 4 minutes. One hour is divided into 15 cycles numbered 0 through 14. It is a synchronous time slot protocol tied to a universal time reference. Frame 0 is synchronized to the start of each hour so that the receiver can derive real time from the current frame and cycle number, thus providing the receiver accurate time within the hour with no need for adjustment.

Moreover, the protocol supports multiple time division multiplexed "phases", wherein for example, a 6400 bits per second (bps) data stream is time division multiplexed into four data streams of 1600 bps. Such a signaling structure is disclosed in commonly assigned U.S. Pat. No. 5,168,493, the entire text and drawings of which is herein incorporated by reference. Thus, the general frame structure shown in FIG. 1 for the single phase shown in FIG. 1 is the same throughout each of four phases.

Each frame comprises a sync portion and several blocks. The sync portion further comprises a Sync 1 portion (S1), a frame information (FI) word and a Sync 2 portion (S2).

Each receiver is assigned a base frame in the set of 128 frames appearing on an radio frequency (RF) channel. A receiver can trade battery life for the more frequent delivery of messages by being assigned to monitor more than one frame per cycle. Once a receiver acquires synchronization to the RF channel, it expects to find its assigned frame within a very tight time window. The use of 4-level FM doubles the data transmission rate per symbol (as compared to 2-level FM) which helps to reduce the effect of simulcast distribution errors and the effect of propagation timing differences between multiple signals within the capture range of the receiver.

As shown in FIG. 3, the Sync 1 (S1) portion of each frame provides for frame timing, symbol timing and indicates the speed of the remainder of the frame. The frame information (FI) word carries 11 bits for the frame and cycle numbers, 5 bits for indication of the time division multiplexed phase of low traffic, 1 bit called a Network Roaming Channel Bit to indicate the presence of a frequency supporting Network-wide roaming service, and other information. The Network Roaming Channel Bit is used to trigger recognition of certain network roaming information which will be described in conjunction with FIG. 4.

The Sync 2 (S2) portion provides for synchronization at the frame's block speed to allow for proper de-multiplexing and decoding of the blocks.

The Block Information (BI) field is the first 1–4 words, called block information words, of the first interleaved block and contains frame and system structure information, some of which is pertinent to the present invention and is explained in greater detail hereinafter.

The address field (AF) starts directly after the block information words and consists of short addresses and long addresses. The vector field (VF) maintains a 1 to 1 relationship with the address field. The vector word points to the start word of the associated message. The message field (MF) contains the message words specified by the vector field. IB represents idle blocks which are unused and are filled with appropriate bit patterns.

FIG. 4 illustrates the structure of the frame information word in greater detail. The various parameters in the frame information word are defined as follows:

C Cycle Number (0–14) $c_3c_2c_1c_0$ 15/hour f Frame Number (0–127) $f_6f_5f_4f_3f_2f_1f_0$ 128/cycle n Network Roaming Channel Bit n=1 indicates network support for roaming and n=0 indicates no network support for roaming r Repeat Paging Indicator
  If r=1, $t_3t_2t_1t_0$ are reserved to indicate a repeat format exists
  If r=0, $tt_3t_2t_1t_0$ are Low Traffic flags for each phase in a frame t Definition dependent on value of "r"
  At 3200 bits/sec $t_3=t_2$ and $t_1=t_0$ representing two phases in the frame
  At 1600 bits/sec $t_3=t_2=t_1=t_0$ representing one phase in the frame
  t=1 Indicates address field contained in block 0
  t=0 Indicates address field extends past block 0
  These flags give early indication that the traffic is light and all addresses are contained within block 0.

x Standard 4 bit Check Character

FIG. 5 illustrates an example of block information word 1. Block information word 1 has 2 "a" bits, $a_0a_1$, which indicate the start of the address field, 6 "v" bits $v_5v_4v_3v_2v_1v_0$ which define the start of the vector field, 2 "c" bits $c_1c_0$ which indicate traffic overflow into the next frame(s), 3 "m" bits $m_0m_1m_2$ which indicate the number of high order frame number bits to be masked and 4 "P" bits $P_3P_2P_1P_0$, which indicate the number of priority addresses at the beginning of the address field.

FIG. 6 illustrates an example of block information words 2, 3 and 4. Word Format Type is represented by format bits $f_2f_1f_0$, s represents the data and x again is the standard 4 bit Check Character.

Below is a table which illustrates the bit pattern definitions for the f and s bits shown in FIG. 6. Depending on the values of bits $f_2f_1f_0$, the data bits $s_{13}$–$s_0$ have a particular meaning or application. When $f_2f_1f_0$ is set to (000), bits $s_{13}$–$s_0$ represent a 9 bit local identification (LID) number ($i_8$–$i_0$) which identifies 512 possible LIDs, and a 5 bit Zone number $C_4C_3C_2C_1C_0$, which represents 32 possible coverage Zones associated with a particular LID.

| $f_2f_1f_0$ | $s_{13}s_{12}s_{11}s_{10}s_9s_8s_7s_6s_5s_4s_3s_2s_1s_0$ | |
|---|---|---|
| 0 0 0 | $i_8i_7i_6i_5i_4i_3i_2i_1i_0C_4C_3C_2C_1C_0$ | 512 Local IDs, 32 Coverage Zones |
| 0 0 1 | $m_3m_2m_1m_0d_4d_3d_2d_1d_0Y_4Y_3Y_2Y_1Y_0$ | Month, Day, Year |
| 0 1 0 | $S_2S_1S_0M_5M_4M_3M_2M_1M_0H_4H_3H_2H_1H_0$ | Sec., Min., Hr. |
| 0 1 1 | Reserved for Future Use | |
| 1 0 0 | Reserved for Future Use | |
| 1 0 1 | $z_9z_8z_7z_6z_5z_4z_3z_2z_1z_0A_3A_2A_1A_0$ | Data, System Message |
| 1 1 0 | Reserved for Future Use | |
| 1 1 1 | $C_9C_8C_7C_6C_5C_4C_3C_2C_1C_0T_3T_2T_1T_0$ | Country Code, Traffic Splitting Flags |

When $f_2f_1f_0$ is set to (001), the data bit pattern $s_{13}$–$s_0$ represents month, day, and year information. When $f_2f_1f_0$ is set to (010), the data bit pattern $s_{13}$–$s_0$ represents second minute and hour information. The $f_2f_1f_0$ bit pattern (101) designates spare data bits $s_{13}$–$s_9$, a system message $A_3$–$A_0$ and time zone information $Z_3$–$Z_0$.

Finally, of importance is the $f_2f_1f_0$ bit pattern (111), which indicates a 10 bit Country Code $c_9$–$c_0$ and 4 bits called Traffic Splitting Flags, both of which will be described in more detail hereinafter.

The Country Codes follow, for example, the CCITT Standard which is well known in the art. The 10-bit Country Code is provided to permit reuse of LIDs in different countries, following the CCITT standard assignment rules. Country Code information is useful by the non-subscribing receiver to facilitate a more efficient scan search by first identifying in what country the receiver is located.

Figure 7:
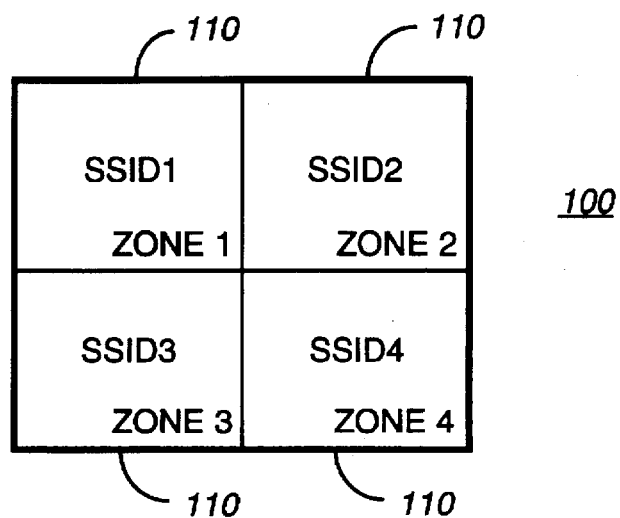
FIG. 7 illustrates a coverage area and zone divisions in accordance with the present invention.

With reference to FIG. 7, the smallest division of a coverage area 100 is defined by a simulcast system identification (SSID). An SSID consists of and is uniquely identified by several identifiers: LID, Zone, Country Code, Traffic Splitting Flags (TSFs) and Frequency. Each Zone 110 has a unique SSID. Thus, if a user desires to receive messages in more than one Zone, the receiver carried by that user would store each of the corresponding SSIDs. The Zones shown in FIG. 7 need not be geographically adjacent to one another.

In the example shown in FIG. 7, there are 512 possible LIDs, each with 32 possible Zones. A "Zone" is a single simulcast area which may be associated with other simulcast areas in a coverage area through a common LID. For example, a service provider is given LID 011011101XXXXX. The service provider has the option to assign this LID to 32 different divisions of a coverage area or Zone. The northern part of a service provider's coverage area may be Zone 1 and would transmit 01101110100001, whereas a southern part is Zone 2 and transmits 01101110100010.

The Traffic Splitting Flags indicate the assignment of 4 groups of roaming traffic to a frequency (channel). Each roaming receiver which finds a frequency to carry a valid LID responds to only one of the 4 Traffic Splitting Flags. When a receiver's assigned flag is equal to 0, the receiver searches for another frequency with the same LID and the assigned flag set equal to 1.

The SSID information is coded into two words:

| 1st Word (000) | 9 bits = 512 LIDs |
| | 5 bits = 32 Zones |
| 2nd Word (111) | 10 bits = 1024 Country Codes |
| | 4 bits = Traffic Splitting Flags |

The 1st Word, called LID1 hereinafter, corresponds to the first block information word (000) referred to in FIG. 3, and the 2nd Word, called LID2, corresponds to block information word (111).

Time and calendar information (block information words f2f1f0=001, 010 and 101) when transmitted, are defined to occur in frame 0, or otherwise in the first valid frame following frame 0. In a roaming capable system, the LID together with the Zone, Country Code and Traffic Splitting Flags occupy the second and third block information words in frame 0. The fourth block information word carries the three available time and calendar information words and is sent in the fourth block information word position in frame 0 in a rotating sequence, one block information word at a time over 3 consecutive cycles. This allows the block information words in 001, 010 and 101 to be updated 5 times each hour.

An advantage of this scheme is that these messages are delivered without addresses. System information is used to attach a vector and message to it.

Bits A3–A0 define the type of message and a class of receiver for which it is intended, as shown in the table below. As an example, all receivers should look at this message, only receivers which are using SSID frequency information should look at this message, and/or only receivers which are using network roaming information (NRI) (to be described hereinafter) to lock to this channel should look at this message. Also instructions on which frequency to go to when a Traffic Splitting Flag is changed, and time zone information can be sent.

| A3 | A2 | A1 | A0 | |
|---|---|---|---|---|
| 0 | 0 | 0 | 0 | All message |
| 0 | 0 | 0 | 1 | Local message |
| 0 | 0 | 1 | 0 | Roam message |
| 0 | 0 | 1 | 1 | Roam Instruction |
| 0 | 1 | 0 | 0 | Time Zone |
| * | * | * | | |
| 1 | 1 | 1 | 1 | Reserved for future use |

When a system message is indicated, an additional vector is added to the end of the vector field. A receiver decodes block information 4 and determines instruction type and which receivers should look at the message associated with this block information word. After the receiver has determined that it should look at the message it processes the address field and vector field as normal but there will be an additional vector at the end of the vector field. Only the receivers which are instructed to look for a message will look at this vector because all the address/vector combinations will point at message words that are located after this vector which is actually in the location of the first message word for the message field. Up to this point, a certain group of receivers have been informed that there is a message, what type of message to expect, and where to look for this message. Once the receiver enters the message field it decodes the message and handles it according to the message type.

An example of a system message is a greeting message transmitted to a receiver which is roaming into a coverage area outside of its home coverage area.

Another example of the utility of a system message is in connection with the Traffic Splitting Flags. When a service provider has two systems which have the same coverage area (i.e., redundant systems) or overlapping portions of coverage areas, and would like to move traffic from one of the systems to another, the following process is performed.

A system message as described above is sent out informing the receiver of there is going to be a traffic change and the traffic change information is a new frequency XXXXXX. The receiver adds this new frequency to its scan list. The receiver should move to XXXXXX frequency and look for an assigned SSID or NRI on this other frequency. In a later transmission, which could be one month later or it could be 1 minute later, the Traffic Splitting Flag is unset on one frequency and set on the other redundant coverage area system. The receiver detects that roaming traffic for the receiver is no longer supported on this channel and moves to the frequency it was instructed to go to by the message. Once there, the receiver determines if the SSID or NRI and Traffic Splitting Flag is set correctly. When the SSID or NRI information stored in the receiver match the corresponding transmitted information, the receiver stays on the frequency (and adds this frequency to its scan list). When a match is not made, the receiver will go back to the frequency it was originally on to make sure that it was not a mistake. When that frequency no longer supports the receiver's roaming traffic, the receiver will start looking on its own (scanning the band) for an SSID or NRI match.

Another way to handle traffic splitting is for the system to unset the Traffic Splitting Flag and let the receiver find a new system transmitting that receiver's SSID or NRI.

It should be understood from the foregoing that the same LID and Zone values may be used by the same provider or other providers on other channels.

Figure 8:
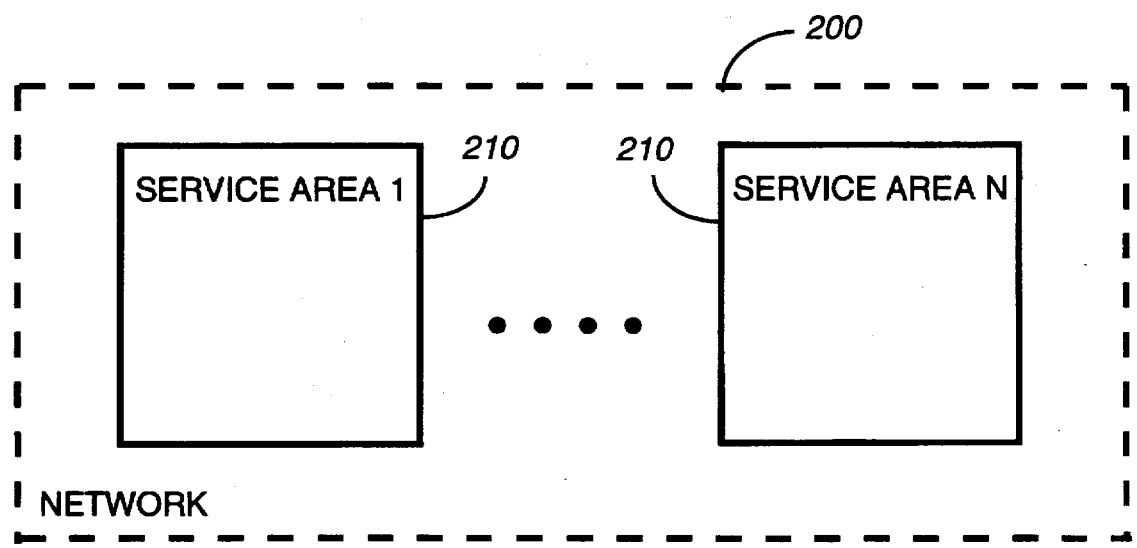
FIG. 8 illustrates a network and service area divisions according to the present invention.

Turning now to FIG. 8, in the case where a receiver desires coverage over a larger region, or to receive messages, on multiple frequencies, which would otherwise be defined by multiple SSIDs, a single piece of identification information is used, rather than multiple SSIDs. This is called network roaming information (NRI). A "Network" 200 is defined as a collection of many Service Areas 210, and a Service Area 210 is a coverage area which would otherwise be defined by a plurality of SSIDs. An NRI consists of a network identification (NID), a Service Area (SA) Traffic Splitting Flags, and a 3-bit NID multiplier to expand the number of unique Networks.

A Network may be formed by an agreement between several otherwise separate service providers, or may be a single large service provider. In a Network, there are a plurality of Service Areas, and in the example described herein, there are 32 possible Service Areas within a Network, identified by a 5 bit pattern, but a Network may be defined to consist of many more or less Service Areas.

Figure 9:
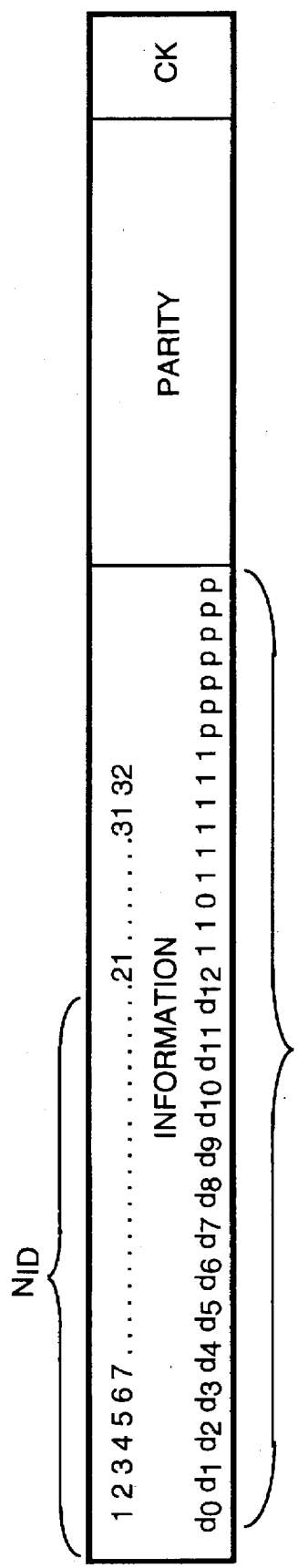
FIGS. 9 and 10 illustrate structures of an address word and a vector word, respectively, in which network roaming identification (NRI) information is coded in accordance with the present invention.
Figure 10:
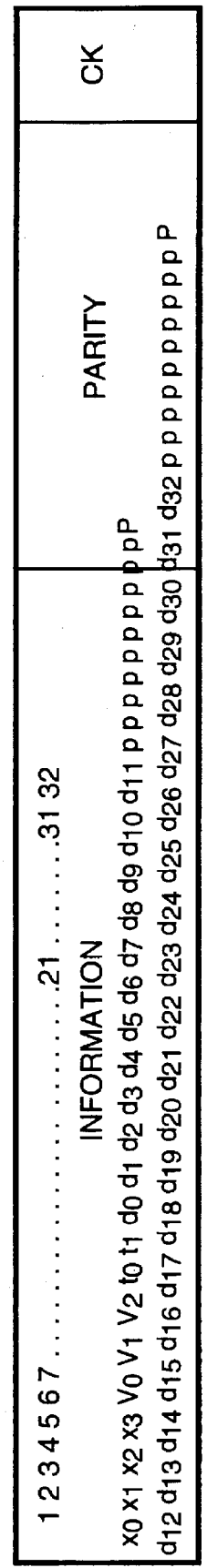

FIGS. 9 and 10 illustrate the manner in which the NRI is encoded in the signal transmitted in each Service Zone. FIG. 10 illustrates a conventional 32–21 binary coded hexadecimal (BCH) address word, which is well known in the art. The first, 21 bits, d0–d20 of this word are used to define an NID, 12 bits of which are used to uniquely identify 4096 networks, as an example.

FIG. 10 illustrates the vector word structure associated with the address word of FIG. 9. The table below gives the bit definitions associated with the vector word of FIG. 10.

| $t_1t_0$ | $d_{11}d_{10}d_9d_8d_7d_6d_5d_4d_3d_2d_1d_0$ | |
|---|---|---|
| 00 | $c_3c_2c_1c_0b_3b_2b_1b_0a_3a_2a_1a_0$ | –3 Numeric Characters with Short Address or 8 Numeric Characters with Long Add. |
| | a11a10a9 ... a0 | or 12 bits usable for Roaming Networks |
| 01 | $s_8s_7s_6s_5s_4s_3s_2s_1s_0S_2S_1S_0$ | 8 Sources plus 9 or 30 Unused Bits |
| 10 | $s_1s_0R_0N_5N_4N_3N_2N_1N_0S_2S_1S_0$ | 8 Sources, 0–63 Message Number, Message Retrieval Flag, and 2 or 23 Unused bits Spare Message Type |

Bits V0V1V2 are used to specify the vector type, such as numeric, tone-only, etc. When the V0V1V2 are set to a value corresponding to a particular type, such as short message/ tone only, this signifies that the 12 bits d0–d11 specify a Service Area, Traffic Splitting Flags and Network multiplier. For example, a0–a4 define the Service Area (32 possible) a5–a8 are the Traffic Splitting Flags and a9–a11 are Network multiplier bits. The Network multiplier bits allow for 8 times 4096 more unique NIDs.

In each Service Area, the transmitted signal includes the NRI associated with that Service Area. The placement structure of the various parts of the NRI in the signaling protocol is shown in FIGS. 12 and 13. In a receiver which is roaming in a Network, a frequency scan list is stored which includes a list of frequencies for which there is a high probability that an SSID or NID match will be obtained. The placement structure of FIG. 13 provides for a way to predict where the NRI information can be found. In any event, when a match cannot be found from the stored scan list, then the receiver searches its entire synthesizer bandwidth. Once the receiver locks onto frame 0 on a particular frequency, a candidate frequency is qualified or disqualified quickly.

FIG. 11 illustrates the placement structure of the SSID information in a four phase (time division multiplexed) expansion of the frame structure shown in FIG. 1. When a single phase system is used, then all of information in phases A, B, C and D collapse into the phase A. When a two phase system is used, then phases A and B collapse together to form one phase and phases C and D collapse together to form another phase.

As is well known in the art, a time division multiplexed system with multiple phases A, B, C and D provides certain traffic handling advantages for a service provider. A receiver capable of decoding information from only a single phase is assigned to a particular phase by the service provider at the time service is initiated. Some receivers are capable of decoding information from one phase at a time, but can switch to a different phase. In this case, a service provider can initially assign a receiver to a particular phase, but can use the system messages described above to inform the receiver from time to time that messages will be transmitted on a different phase. Finally, some receivers are capable of decoding multiple phases and can therefore, as shown by FIG. 11, lock onto an assigned frame quicker than a single phase receiver.

In order to provide roaming service, all channels (frequencies) in a system which are roaming-capable are required to transmit fully a predetermined number of frames. For example, it can be required that all roaming channels transmit frames 0 through frame 15 with frame 0 aligned to the four minute time mark. It is established, in this example, that frames 0–15 must be present and that these frames contain the LID words LID1 and LID2 in the frames and phases as shown in FIG. 11.

Across the phases, LID1 and LID2 are offset by one frame so that a receiver assigned to a specific phase is able to determine its desired SSID presence in the least amount of search time on each channel, and to balance or distribute information overhead among the phases.

The placement structure shown in FIG. 11 provides a known time position to allow for quick processing of candidate frequencies when a receiver is roaming. If the roaming decision can be made on the basis of LIDs only, then 16 channels can be processed every four minutes. Since frames 0–15 must be present, a fast scan over a large bandwidth is made possible using symbol rate detection to identify roaming capable channels. LID2 is transmitted only in each phase once per cycle and LID1 is transmitted every four frames, once in each phase (in at least frames 0–15).

On all frequencies (channels) which are roaming capable, only frames 16–127 may be shared with other service providers or replaced with an alternate protocol. When a frame is transmitted, it must contain a predetermined SSID pattern, such as, for example, the LID following the pattern established in frames 0–15.

"T" refers to the optional presence of three block information words sent out in frame 0 on a rotating basis to indicate time and calendar information, as described above. The "T" type block information words are sent out in all 4, 2 or 1 phases depending on the system operating speed. It takes 3 cycles to completely refresh a receiver with a complete set of time and calendar information (5 updates each hour). The time/calendar instructions are optional, but when carried by the system, are required to follow the rotating pattern of one selection in every cycle. This format provides a known time/calendar position to permit a receiver to quickly process the candidate frequencies when roaming. The rotational sequence is changeable so that a "T" block information word format 101 is used to send a roaming system message when needed.

FIG. 12 illustrates a first placement configuration for NRI information, identified N1–N10. Like the LIDs, the SSID information and the NRI information are required to appear once during frames 0–15. Thereafter, the pattern must continue in those additional frames available. When a service provider chooses to continue the NRI placement sequence past frame 15, the sequence must include all NRIs active on the channel. The pattern shifts positions across phases and frames every four minutes (1 cycle) allowing a single phase pager which is synchronously decoding a channel to eventually see the NRI in its assigned frame. The detection of an NRI twice indicates that all NRIs have been examined.

The placement of 10 NRIs N1–N10 are shown in FIG. 12 as an example. The NRIs are placed sequentially through the phases in an offset fashion, similar to the SSID placement structure of FIG. 11. When a single phase is transmitted, then all of the information collapses into a single phase such that a different NRI appears in each of frame 0 through frame 9. This structure is precessed such that the sequence is offset by at least one frame in the next cycle to avoid shadowing problems in the case of a receiver located where two systems have overlap. For example, a receiver's messages may be assigned to Frame 3, thereby precluding a search for the NRI in Frame 3. Thus, if a nearby system would always transmit its NRI in Frame 3, the receiver would never detect the NRI. By moving the NRI to different frames in different cycles this "shadowing" problem is eliminated.

Turning to FIG. 13, a second placement sequence for NRI information will be described. In this sequence, all NRIs supported on a channel are required to appear at least once during frames 0–15. However, according to this configuration, an expected or predicted position for an NRI is determined by the following set of rules:

(a) Each frequency or channel is represented by a number in the range of 0–15. M=Modulo16 of Integer [Freq kHz/Channel Spacing kHz]

(b) N=Modulo16 of NID (4 least significant bits);

(c) C=cycle number (0–15); and (d) Expected frame=F=Modulo16 of N+M+C.

According these rules, it is possible to search 16 consecutive frequencies for the same NRI in the 30 second (16 frame) period at the beginning of each 4 minute period of time. It also causes the NRI to shift one frame each cycle which alleviates possible "shadowing" problems. This placement sequence has a lower NRI "overhead" for cases where the channel carries less than 16 NRIs.

Figure 14:
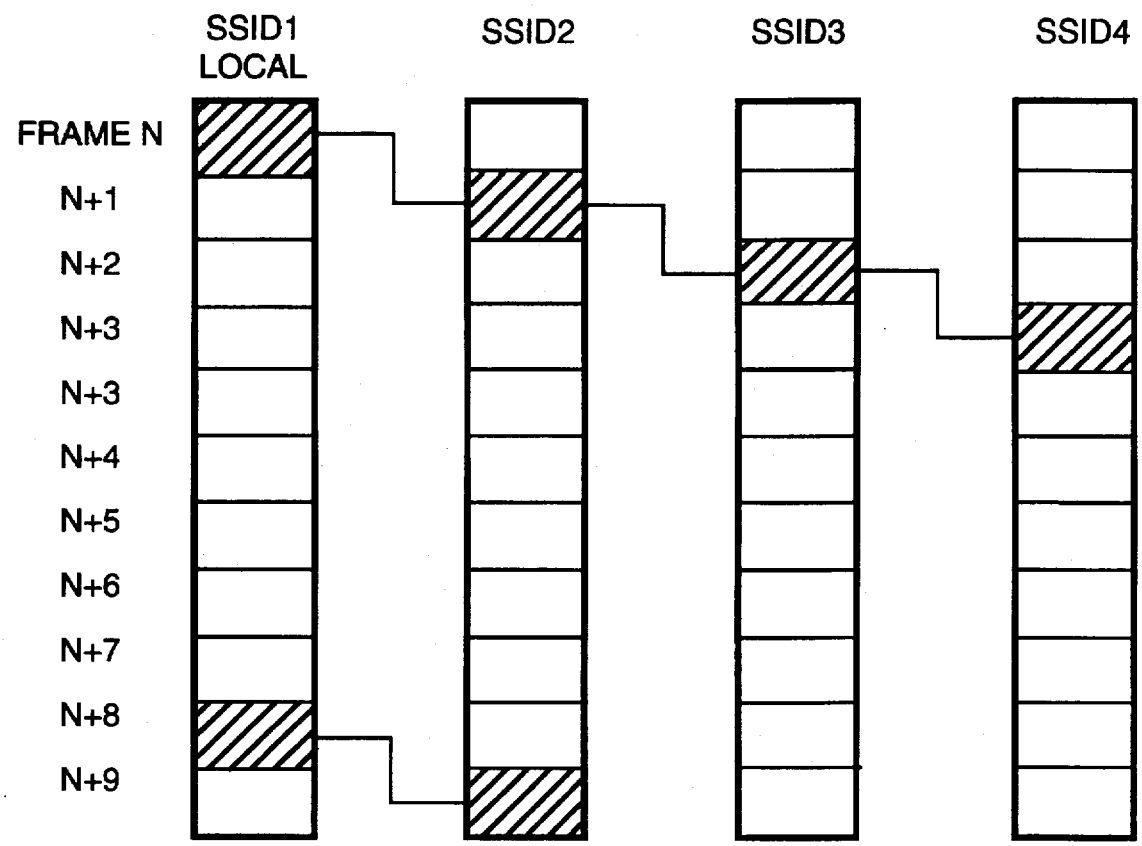
FIG. 14 is a diagram illustrating a scan sequence used by a receiver for channel identification during possible frequency overlap situations.

FIG. 14 illustrates a frame offset mechanism which enables a receiver to scan frequencies in every frame which are offset from its home frame as indicated. This frame offset method is useful in situations where a receiver is straddling an area where there is two or more possible matching frequencies in the same coverage area. In order that a match on any of the possible frequencies can be achieved, for each frequency of which coverage is desired, a frame is chosen in which the receiver can match SSID or NRI information, which is different from the frames for the other frequencies. For example, as shown in FIG. 14, the frame chosen in each frequency is offset by one frame. Other frames could also be chosen. Consequently, the receiver is able to detect for all SSIDs since each is assigned to a different frame in the cycle.

Figure 15:
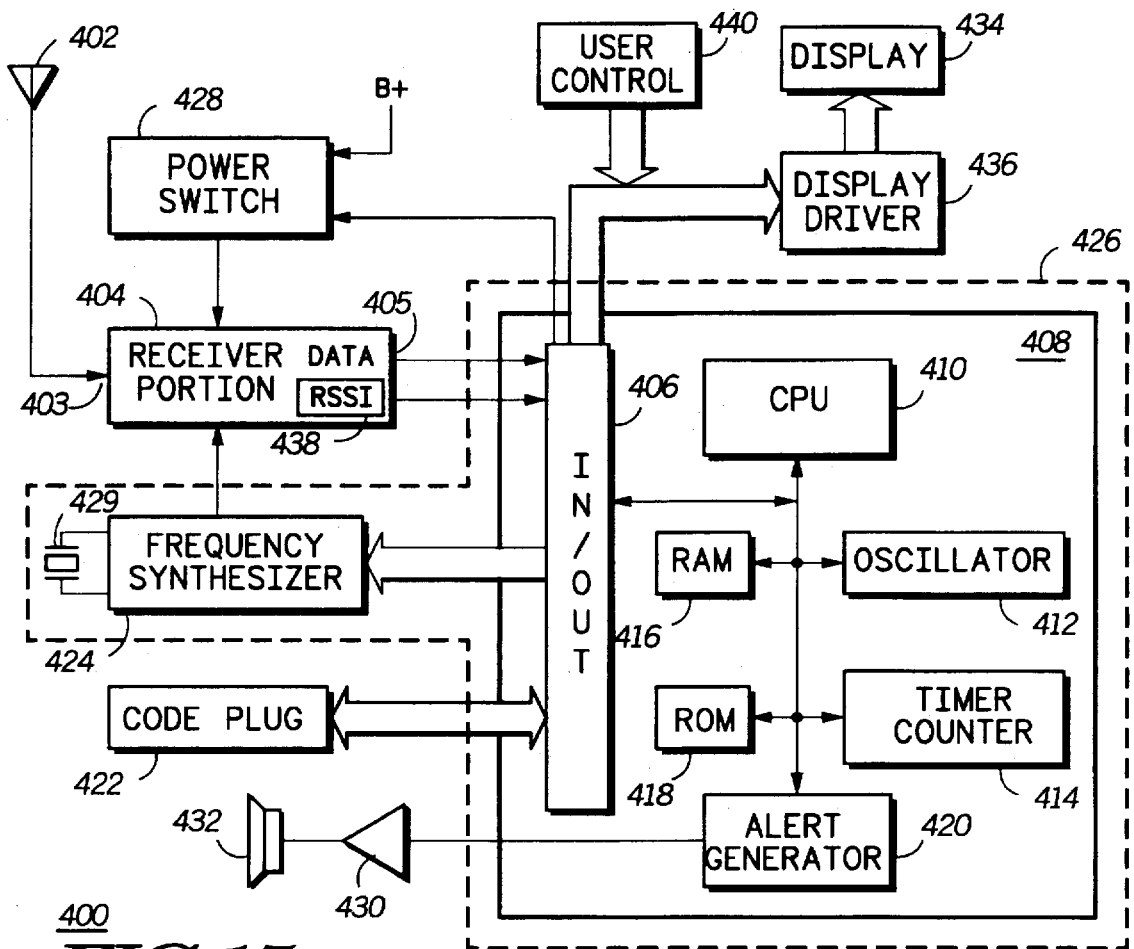
FIG. 15 is an electrical block diagram of a communication receiver in accordance with the present invention.

FIG. 15 shows an exemplary electrical block diagram of a communication receiver 400, and particularly a selective call receiver, according to the present invention. Coded message signals transmitted are received by an antenna 402 which couples to the input 403 of the receiver portion 404. The receiver portion 404 preferably is an FM receiver. The received coded message signals are processed by receiver portion 404 in a manner well known in the art, and provided at the output 405 as a stream of binary information. The output 405 couples to the input/output (I/O) port 406 of the microcomputer 408. Receiver portion 404 optionally includes received signal strength indicating (RSSI) means 438 which also connects to the I/O port 406 of the microcomputer 408.

Microcomputer 408, which is embodied, for example, by a Motorola MC68HC05 series microcomputer, performs a variety of functions, including decoding the binary information. Microcomputer 408 includes a central processor unit (CPU) 410, oscillator 412, timer counter 414, random access memory (RAM) 416, read only memory (ROM) 418 and alert tone generator 420. CPU 410 controls the operation of the communication receiver 400 and processes the received coded message signals. Oscillator 412 provides the clock for the operation of the CPU 410, and provides the reference clock for timer counter 414. The oscillator 412 is controlled by a crystal, not shown in the diagram. Assigned transmission slot and channel identification information and pager addresses are stored in code plug 422, which is a programmable read only memory, such as an electrically erasable programmable read only memory (EPROM). In addition, the SSID information and NRI information is also stored in the code plug 422. The RAM 416 is used to store code plug information when the communication receiver 400 is initially turned on, and to store messages as they are received. ROM 418 contains the firmware which controls the microcomputer operation. The firmware includes such programs as for controlling the decoding of transmission slot identity information, channel identification information, receiver address, receiver scanning frequency lists, NRI information, SSID information, and other receiver functions. Alert generator 420 generates an audible alert signal upon reception of a message.

When the communication receiver 400 is initially turned on, microcomputer 408 functions as a synchronization means, enabling the communication receiver 400 to synchronize the assigned transmission slot, after the receiver detects information in frame 0 and synchronizes to the transmitted signal. Microcomputer 408 also functions as the decoder for decoding channel identification information, LID information, NID information and pager address information. Microcomputer 408, in conjunction with frequency synthesizer 424 and crystal 429, functions as a channel selecting means 426 used to control the scanning of the communication receiver 400. Microcomputer 408, in conjunction with power switch 428, provides a battery saving function for the receiver 400. User controls 440, including, for example, well-known switches and buttons, provide for control of the communication receiver 400 by the user.

Figure 16:
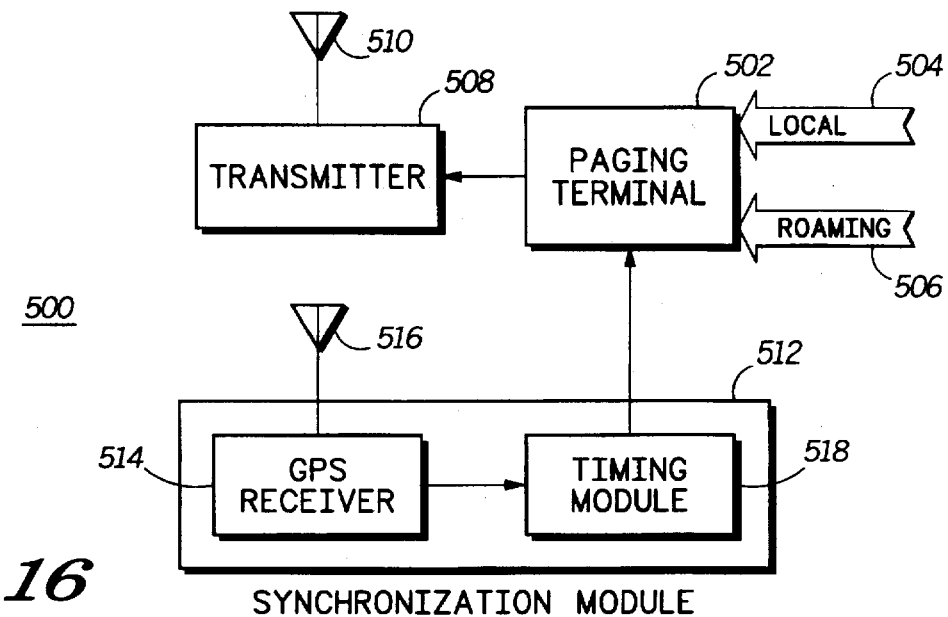
FIG. 16 is an electrical block diagram of a transmitter station in a paging system according to the present invention.

FIG. 16 illustrates an example of a transmitter station 500 useful in accordance with the present invention. Transmitter station 500 comprises a paging terminal 502 used to enter messages originated in a home or local area with respect to a receiver, as indicated at 504, or the messages are for receiver that is roaming outside its local area, as indicated at 506. Messages for a roaming receiver which are originated outside of the coverage area home or local area of a receiver are conveyed to the paging terminal 502 by a hardwire interconnect with a paging terminal in the home or local area, such as a dial-up or hardwired phone line, or by means of an RF signal, such as a satellite receiver.

Messages entered into paging terminal 502 are processed for transmission into the signaling format or protocol described above, and in the aforementioned patent, or another suitable signaling protocol. The messages are placed in queues corresponding to the frame to which a receiver is assigned. The output of the paging terminal is coupled to an RF transmitter 508 for transmission via an antenna 510. It is appreciated that the paging terminal 502 optionally controls more than one transmitter, as in a wide area simulcast system, and synchronization of multiple transmitters in a simulcast system is provided. Various methods for synchronizing the transmitters are available, such as described in U.S. Pat. No. 4,718,109 to Breeden et al.

Furthermore, in order to provide for global synchronization of transmitters to frame 0 as described above, a synchronization module 512 is coupled to the paging terminal 502. The synchronization module preferably comprises a global position system (GPS) receiver 514 and a timing module 516, which together enable the paging terminal 502 to determine an accurate occurrence of frame 0. It will be appreciated that alternatively, instead of a GPS receiver 514, another time standard signal can be monitored by suitable monitoring devices.

Turning now to FIG. 17, a firmware diagram depicts firmware elements in the ROM 418 of the communication receiver 400 in accordance with the present invention. The firmware elements comprise an initialization element 450 for choosing from a pre-programmed primary scan list a frequency identifier corresponding to a most frequented coverage area. The firmware elements further comprise a first tuner element 451 for tuning the communication receiver 400 to a receive frequency identified by the frequency identifier. The firmware elements further comprise a baud rate detection element 452 for performing baud rate detection on a signal received on the receive frequency. Preferably the baud rate detection is performed in a conventional manner, as described in U.S. Pat. No. 5,077,758 to DeLuca et al.

Also included in the firmware elements is a parameter decoder element 453 for decoding from the signal received, in response to finding a baud rate matching one of at least one predetermined baud rate, at least one of a received coverage area identifier and a received zone identifier. Preferably, the coverage area identifier and the zone identifier correspond, respectively, to the NID and SSID information described herein above. Preferably, the one of at least one predetermined baud rate is selected from 1600, 3200, and 6400 bps. It will be appreciated that, alternatively, other bit rates can be utilized as well.

The parameter decoder element 453 decodes the received identifier in an attempt to find a coverage area match by determining that the at least one of the received coverage area identifier and the received zone identifier matches one of the corresponding coverage area identification parameters stored in the communication receiver 400. In addition, the firmware elements include a first lock element 454 for locking the communication receiver 400 to the signal on the receive frequency by well known techniques, in response to finding the coverage area match.

The firmware elements further comprise a selector element 455 for selecting from the primary scan list a next frequency identifier, in response to the baud rate detection element 452 not finding the baud rate matching the one of the at least one predetermined baud rate. The firmware elements also include a repeat element 456 for repeating the tuning, baud rate detection, decoding and locking steps for the receive frequency corresponding to the next frequency identifier. In addition, the firmware elements include a redo element 457 for redoing the selecting and repeating steps for a predetermined time in response to the coverage area match not being found, and a terminator element 458 for terminating the selecting and repeating steps in response to the coverage area match being found and the communication receiver 400 being locked to the signal.

The firmware elements further comprise a zone identifier lock element 459 for determining, in response to locking onto the signal, whether a zone identifier match was responsible for locking the communication receiver 400. The firmware elements also include a zone identifier availability element 460 for determining whether any zone identifiers are included on the primary scan list, in response to determining that a zone identifier match was not responsible for locking the communication receiver 400. In addition, the firmware elements include a periodic check element 461 for determining whether a time for a periodic check of zone identifiers has arrived, in response to the zone identifier availability element 460 determining that at least one zone identifier is included on the primary scan list. The firmware elements also include a test frequency baud rate detection element 462 for performing conventional baud rate detection on test frequencies corresponding to each zone identifier included on the primary scan list, in response to determining that the time for the periodic check of zone identifiers has arrived.

The firmware elements further comprise a zone identifier decoder element 463 for decoding the zone identifier received on a test frequency, in response to the test frequency baud rate detection element 462 finding the baud rate matching the one of the at least one predetermined baud rate on the test frequency. The firmware elements further comprise a zone identifier match element 464 for determining whether the zone identifier received matches the zone identifier on the primary scan list that corresponds to the test frequency. The firmware elements also include a mover element 465 for moving the zone identifier and the corresponding frequency identifier to the top of the primary scan list, in response to the zone identifier received matching the zone identifier on the primary scan list that corresponds to the test frequency. In addition, the firmware elements include a second lock element 466 for locking the communication receiver 400 to the test frequency after moving the zone identifier and the corresponding frequency identifier to the top of the primary scan list. The firmware elements also include a random search determiner element 467 for determining whether to perform a random search for a coverage area identifier, in response to the selecting and repeating having been redone for the predetermined time. In addition, the firmware elements comprise a candidate channel list form element 470 for forming, in response to the random search determiner element 467 determining that the random search is to be performed, a candidate channel list by adding frequencies to the candidate channel list that are different from those identified by any frequency identifiers of the primary scan list and that are determined to have signal energy at the baud rate matching the one of the at least one predetermined baud rate.

The random search determiner element 467 comprises a prompter element 468 for prompting a user of the communication receiver 400 that the communication receiver 400 is unable to match the coverage area identification parameters on the primary scan list, by sending an appropriate message to the display 434, preferably accompanied by an audible or tactile alert. The random search determiner element 467 also includes a control responder element 469 for determining that the random search is to be performed, in response to the absence of a predetermined control sequence on the user controls 440 by the user within a predetermined time, e.g., fifteen seconds.

The candidate channel list form element 470 comprises a time synchronization checker element 471 for checking whether the communication receiver has been synchronized earlier with time information derived from the frames of the protocol. The candidate channel list form element 470 further comprises a window adjustment element 472 for adjusting, in response to the communication receiver 400 having been synchronized earlier with the time information, a roaming time window in accordance with the arithmetic product of a predetermined timer inaccuracy per unit of time and the elapsed time since the communication receiver 400 was last synchronized with the time information, thereby forming an adjusted roaming time window.

For example, assume that the oscillator 412 produces a reference clock signal having a frequency accuracy of ±thirty parts per million (PPM). Then if the communication receiver 400 was last synchronized with the time information ten hours (36,000 seconds) ago, the accuracy of the beginning and end of the roaming time window, i.e., the time window during which mandatory roaming information is transmitted on all transmitters 508 that serve roaming traffic, can be determined by the communication receiver 400 to within ±(30/1,000,000)×36,000=±1.08 seconds. Thus, to be certain that the communication receiver 400 monitors for roaming information only during the actual mandatory roaming traffic window, the roaming time window within the communication receiver 400 is adjusted to start 1.08 seconds late, and to end 1.08 seconds early relative to the roaming window time indicated by the internal time kept by the communication receiver 400. It will be appreciated that baud detection can be performed outside the mandatory roaming time window as well under certain conditions, e.g., when the communication receiver 400 is not synchronized to the time signal transmitted by the communication system.

The candidate channel list form element 470 further comprises a roaming information determiner element 473 for determining from the adjusted roaming time window and current time indicated by the timer counter 414 in the communication receiver 400 whether it is time for the mandatory roaming information to be transmitted. In addition, the candidate channel list form element 470 includes a second tuner element 474 for tuning the communication receiver 400 to a channel frequency that has been added to the candidate channel list, and a roaming information decoder element 475 for decoding roaming information carried on the channel frequency. The candidate channel list form element 470 also includes a channel frequency removal element 476 for removing the channel frequency from the candidate channel list in response to finding from the roaming information that the channel frequency does not carry messages for roaming traffic; and a resynchronization element 477 for resynchronizing the communication receiver 400 with the frame-derived time information included on the channel frequency, in response to finding from the roaming information that the channel frequency carries messages for roaming traffic.

The candidate channel list form element 470 further comprises a coverage area identifier decoder element 478 for decoding a candidate coverage area identifier received on the channel frequency, and a comparator element 479 for comparing the candidate coverage area identifier with all coverage area identifiers included in the primary scan list. The candidate channel list form element 470 further comprises a placement element 480 for placing the candidate coverage area identifier and a frequency identifier identifying the channel frequency at the top of the primary scan list, and locking the communication receiver 400 to the channel frequency, in response to the candidate coverage area identifier matching one of the coverage area identifiers included in the primary scan list.

An example of a primary scan list is shown below. Generally, at power-up the top entry in the list is the pre-programmed frequency and associated SSID or NRI of the communication receiver's "home" area. Next, other SSIDs and NIDs to which the user has subscribed are listed. After a period of operation, the communication receiver 400 dynamically rebuilds the primary scan list such that the top entry is the frequency and associated SSID or NID that the receiver was last locked to. As new frequencies are added, older frequencies associated with NIDs are removed if the scan list memory locations are full.

| FREQUENCY ID | SSID | NRI |
|---|---|---|
| Frequency 1 | — | NID1 |
| Frequency 2 | SSID2 | |
| Frequency 5 | SSID3 | NID1 |
| Frequency 3 | — | NID1 |
| Frequency 4 | — | NID1 |
| Frequency N | SSIDN | NID1 |

Figure 18:
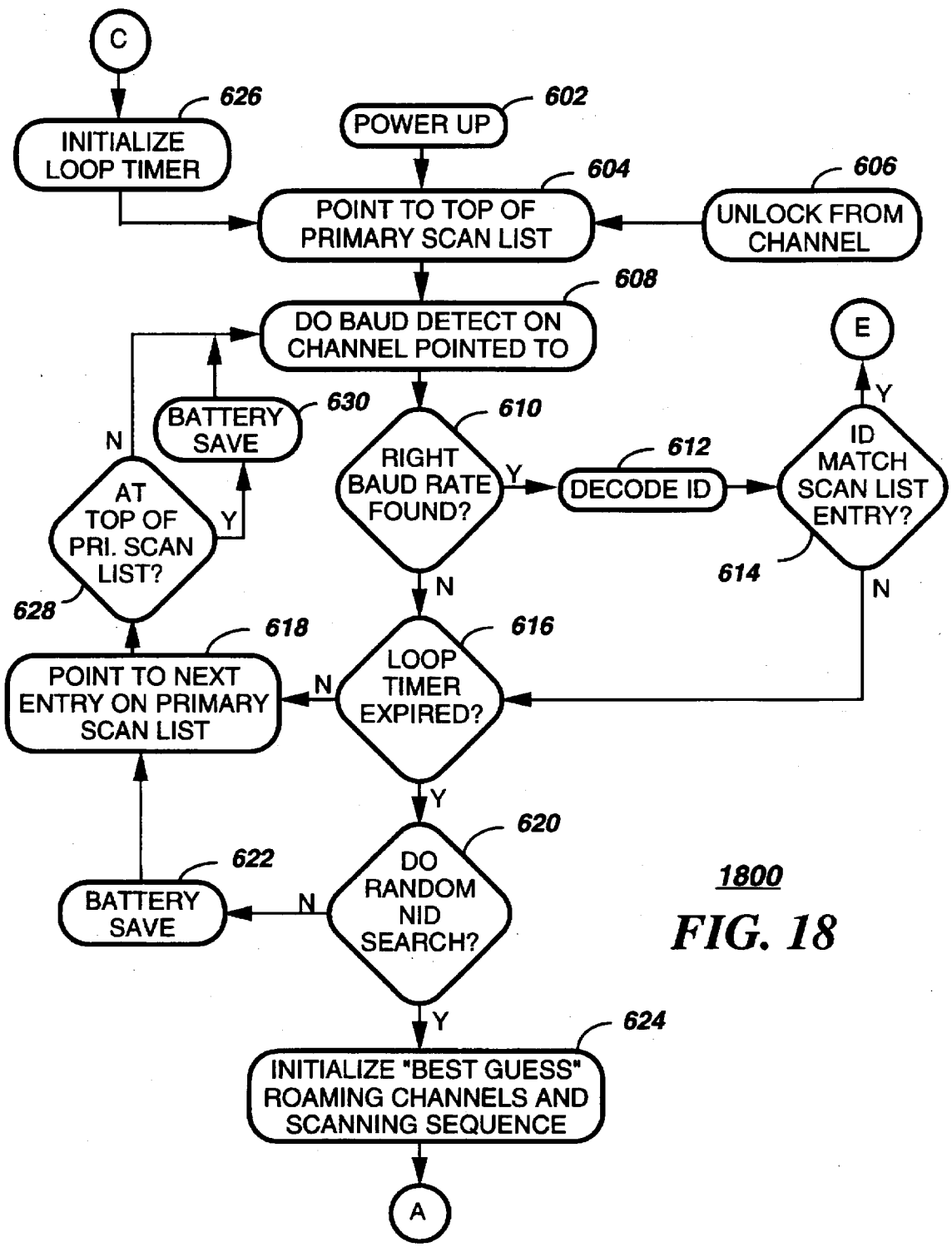
FIGS. 18–21 are flow charts depicting a receive frequency selection method in accordance with the present invention.

FIGS. 18–21 are flow charts 1800, 1900, 2000, 2100 depicting a receive frequency selection method, i.e., channel scanning method, in accordance with the present invention. FIG. 18 begins with a power up 602 of the communication receiver 400. In response, the processor 410 accesses the initialization element 450 and points 604 to the top of the primary scan list. Step 604 also can be entered in response to the communication receiver 400 unlocking 606 from the channel for a predetermined time, e.g., four minutes. Step 604 can be entered as well as from the flow chart 2000 (FIG. 20) through step 626, which initializes the loop timer (checked in step 616). Next, the processor 410 accesses the baud rate detection element 452 and performs baud rate detection on the channel identified by the frequency identifier pointed to. Then the processor 410 checks 610 whether the correct baud rate, e.g., 1600, 3200, or 6400 bps, was found. If so, the processor 410 accesses the parameter decoder element 453 to decode 612 a NID or SSID from the signal received. Next, the processor checks 614 whether the NID or SSID match an entry on the primary scan list. If so, the flow moves to the top of flow chart 2100 (FIG. 21), which will be discussed further below. If the NID or SSID does not match an entry on the primary scan list, the flow moves to step 616. In addition, step 616 is reached directly from step 610 if the correct baud rate was not found in step 610.

Figure 19:
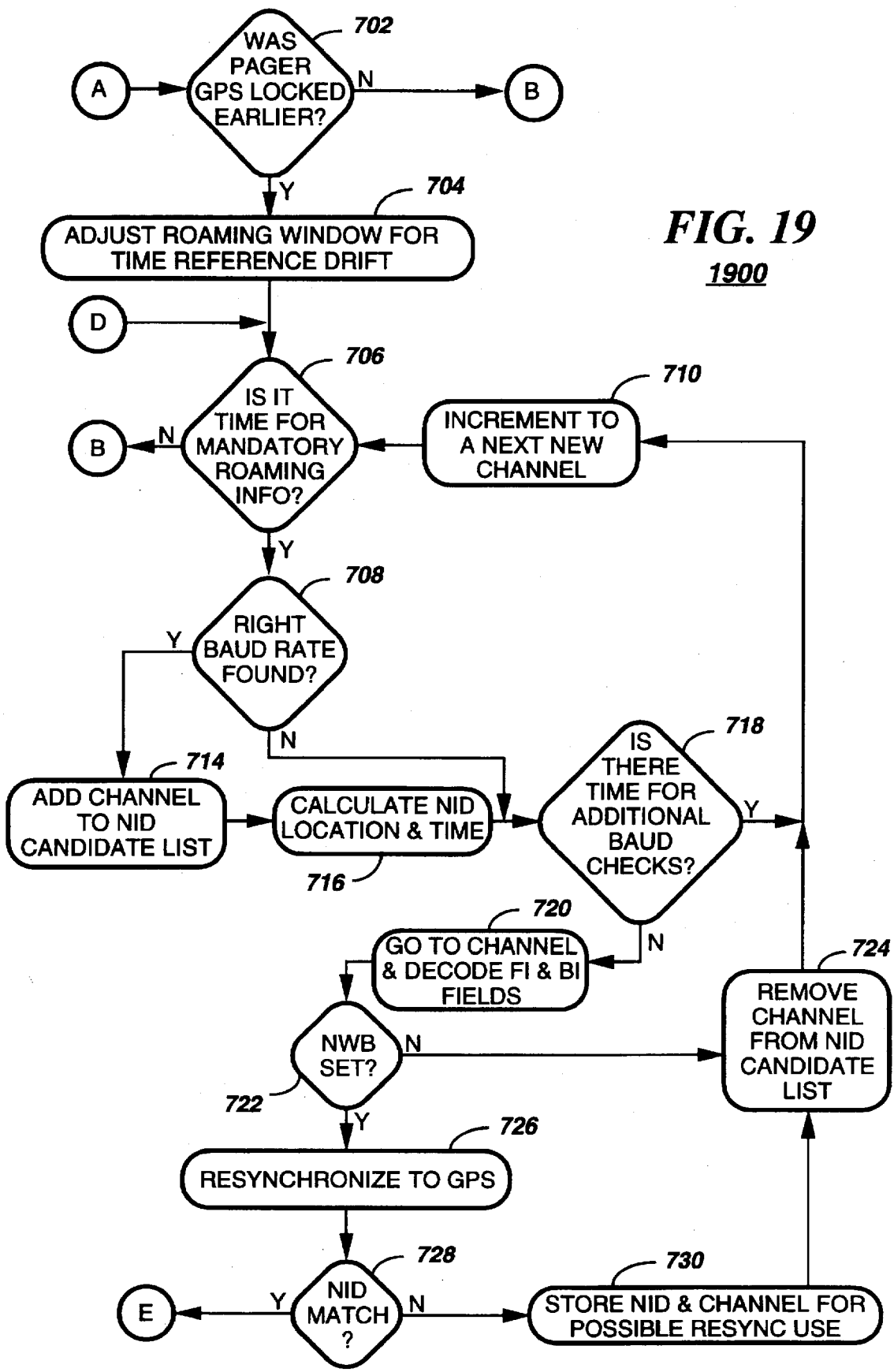

In step 616 the processor 410 checks a loop timer that the processor 410 provides to keep from spending too much time checking the primary scan list, e.g., more than five minutes, in the loop comprising steps 608, 610, 616, 618, and 628, and sometimes steps 612, 614 and 630. If the channel timer has not expired, the processor 410 points 618 to the next entry on the primary scan list, and then checks 628 whether the next entry is at the top of the primary scan list. If not, flow then returns to step 608 to perform baud detect on a next frequency. If the next entry is at the top of the primary scan list, the processor 410 places 630 the communication receiver 400 into a battery saving mode for a first predetermined time, e.g., one second, and then the flow returns to step 608. On the other hand, if the channel timer has expired, the processor 410 accesses the random search determiner element 467 to determine 620 whether to perform a random search of channel frequencies to locate a received NID that matches a NID on the primary scan list. If the random search is not required, the communication receiver 400 enters 622 a battery save cycle for a second predetermined time, e.g., fifteen minutes, after which the flow returns to step 622 to point to a next entry on the primary scan list. If the random search is required, the processor accesses the ROM 418 and initializes 624 "best guess" roaming channels and a scanning sequence. Preferably, the "best guess" roaming channels and a scanning sequence are pre-programmed by the service provider at the time of initial service subscription, in accordance with the coverage areas the user expects to visit most frequently. After step 624, the flow moves to the top of flow chart 1900 (FIG. 19).

Figure 20:
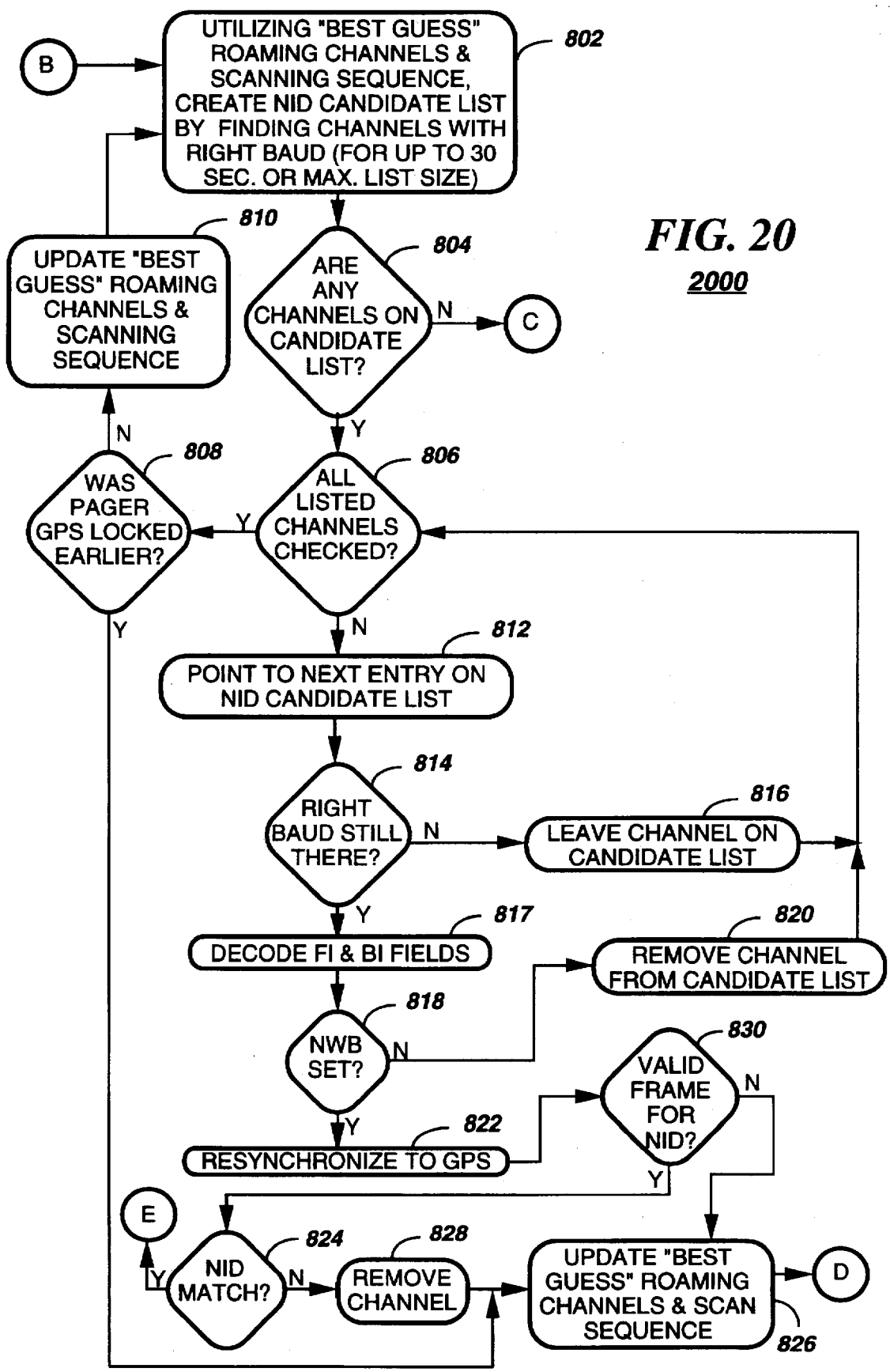

Flow chart 1900 begins by the processor 410 accessing the time synchronization checker element to check 702 whether the communication receiver 400 was locked earlier (but not so much earlier as to exceed a predetermined maximum time without lock) to the precision frame-derived time information transmitted with the message information and preferably synchronized to GPS. If the communication receiver 400 was not earlier locked (or was unlocked longer than the predetermined maximum time), then the flow moves to the flow chart 2000 (FIG. 20). If the communication receiver 400 was locked earlier to the precision time information, the processor 410 accesses the window adjustment element to adjust 704 the roaming window for drift of the time reference in the communication receiver 400, as discussed herein above. Next the processor 410 accesses the roaming information determiner element to check 706, using the adjusted roaming window, whether it is time for the mandatory roaming information to be transmitted. If not, the flow returns to the top of the flow chart 2000 (FIG. 20).

If it is time for mandatory roaming information, the processor 410 tunes the communication receiver 400 to the first "best guess" channel and performs baud detection to check 708 whether the correct baud rate is found thereon. If not, the flow moves to step 718 for checking whether there is time for additional baud checks. If in step 708 the correct baud rate is found, the processor 410 adds 714 the channel to the NID candidate list. The processor 410 then calculates 716 the frame(s), and thus the scheduled time(s), in which each of the NIDs of the primary scan list will occur (if present) on the channel, in accordance with the formula described herein above. (Expected frame=F=Modulo16 of N+M+C.) Then the processor 410 checks 718 whether there is sufficient time for additional baud checks before a frame arrives that can potentially contain one of the scheduled NIDs. If there is time, the flow moves to step 710 to increment to a next new channel, and thence returns to step 706. If there is not time for more baud checking, then the processor 410 accesses the second tuner element 474 to tune 720 the communication receiver 400 to the channel associated with the potentially forthcoming NID and then accesses the roaming information decoder element to decode the frame information (FI) and block information (BI) fields.

Figure 21:
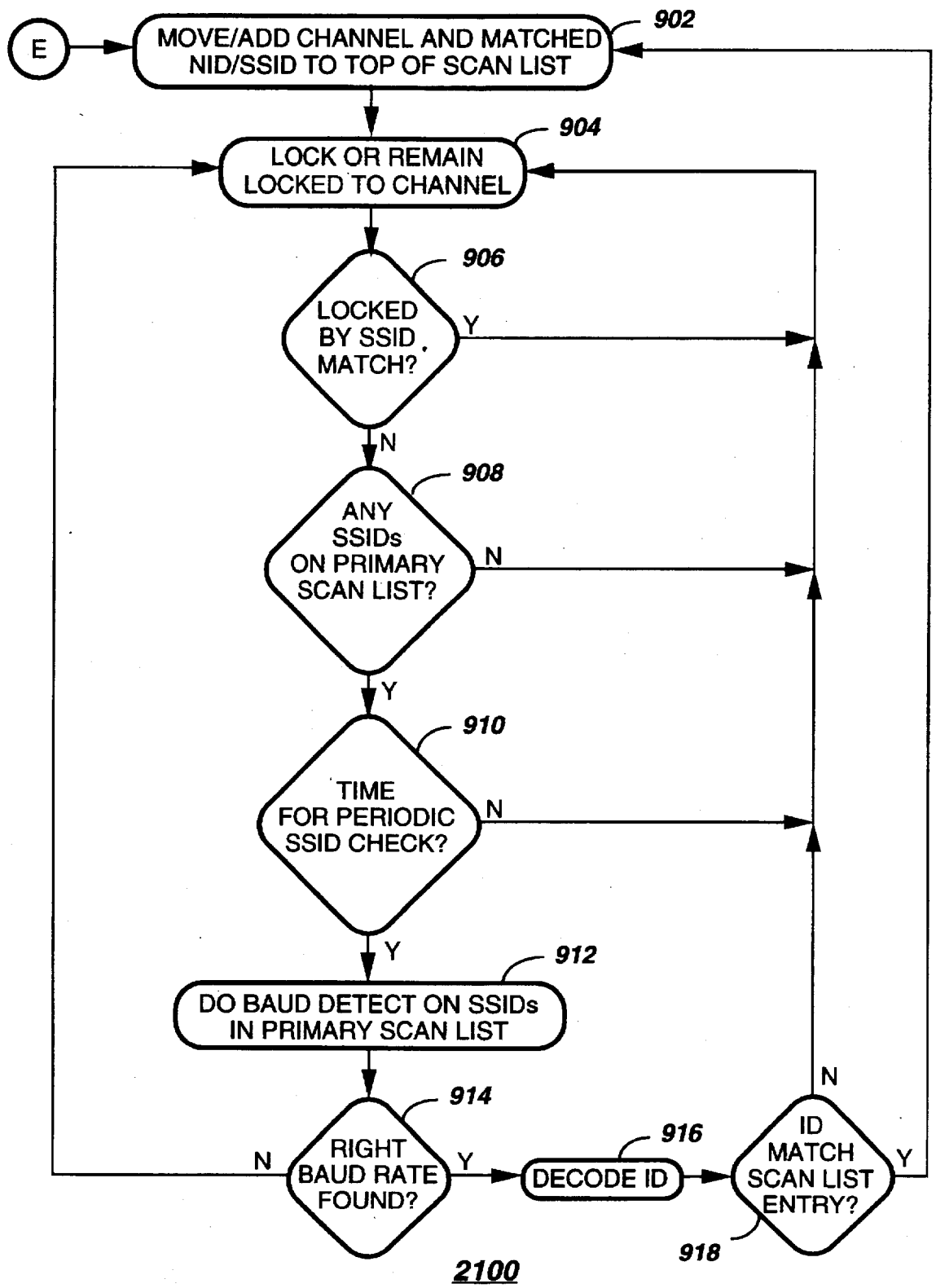

Next, the processor 410 checks 722 the Network Roaming Channel Bit of the FI field to determine whether the bit is set, thus indicating the presence of roaming traffic on the channel. If not, the processor 410 accesses the channel frequency removal element 476 to remove 724 the channel from the NID candidate list. Flow then returns to step 710 to increment to a next new channel for baud detection. If, on the other hand, in step 722 the Network Roaming Channel Bit is set, then the processor 410 accesses the resynchronization element 477 to resynchronize 726 the timer counter 414 with the frame-derived time information that is required to be transmitted with precision on all channels carrying roaming traffic. In addition, the processor 410 accesses the coverage area identifier decoder element 478 to determine 728 whether the received NID matches the corresponding NID of the primary scan list. If not, the NID and channel frequency are stored 730 for possible use in keeping the communication receiver 400 synchronized to the time signal transmitted thereon. Then the flow moves to step 724 to remove the channel from the candidate NID list. On the other hand, if in step 728 the NID is found to match, then the flow moves to the top of the flow chart 2100 (FIG. 21).

Referring to FIG. 20, a flow chart 2000 depicts channel scanning operation when the communication receiver 400 has not been locked to the precision frame-derived time information or when it is simply not time for the mandatory roaming traffic to be transmitted. The flow begins with the processor 410 accessing the candidate channel list form element to utilize 802 the pre-programmed "best guess" roaming channels and scanning sequence to create the NID candidate list by locating channels having the correct baud rate. Preferably, this task continues for up to thirty seconds, or until a predetermined maximum number of channels have been added to the NID candidate list, whichever occurs first. Next, the processor 410 checks 804 whether any channels are on the candidate list. If not, the flow returns to step 604 (FIG. 18) t0 again test channels on the primary scan list.

If, on the other hand, in step 804 some channels were found, then the processor 410 checks 806 whether all channels listed on the NID candidate list have been checked at least to determine whether the correct baud rate is still there (step 814). (On the first pass through the flow chart 2000, the result of step 806 always is negative.) If all listed channels have not been checked, the processor 410 accesses the second tuner element 474 to tune 812 the communication receiver to the channel corresponding to the next entry on the NID candidate list. Then the processor 410 accesses the baud rate detection element to check 814 whether the correct baud rate is still on the channel. If not, the processor 410 does not have sufficient information to make a decision, and thus leaves 816 the channel on the NID candidate list. Flow then returns to step 806 to determine whether all listed channels have been checked. If all channels have been checked, then the flow moves to step 808 where the processor 410 determines whether the communication receiver 400 was locked earlier to the time signal.

If on the other hand in step 814 the correct baud rate is still detectable on the channel, then the processor 410 accesses the roaming information decoder element 475 to decode 817 the FI and BI fields. The processor 410 then determines 818 whether the Network Roaming Channel Bit of the FI field has been set. If not, the processor 410 accesses the channel frequency removal element to remove 820 the channel from the NID candidate list. Flow then returns to step 806.

On the other hand, if in step 818 the Network Roaming Channel Bit of the FI field has been set, then the processor accesses the resynchronization element 477 to resynchronize 822 the communication receiver 400 with the frame-derived time information on the channel. Next, the processor 410 checks 830 whether the current frame is a valid frame for any of the NIDs on the primary scan list. If not, the flow moves to step 826. If so, the processor 410 accesses the coverage area identifier decoder element 478 to decode the received NID (if present). The processor 410 then accesses the comparator element 479 to determine 824 whether the received NID matches a NID on the primary scan list. If the received NID does not match any NID on the primary scan list, then the processor 410 removes 828 the channel from the candidate list and updates 826 the "best guess" roaming channels and scanning sequence to reflect all channels removed from the candidate list. Flow then moves to step 706 of flow chart 1900 (FIG. 19). If, on the other hand, the received NID matches a NID on the primary scan list, then the flow moves to the top of flow chart 2100 (FIG. 21).

Referring to FIG. 21, flow chart 2100 begins with the processor 410 accessing the placement element 480 to move or add 902 the channel frequency and the corresponding matched ND or SSID to the top of the primary scan list. Then the processor 410 controls the communication receiver 400 to keep 904 the communication receiver 400 locked to the channel. Then the processor 410 accesses the zone identifier lock element 459 to determine 906 whether an SSID was responsible for locking the communication receiver 400 to the channel. If so, nothing further need be changed, and the flow returns to step 904. If not, the processor 410 accesses the zone identifier availability element 460 to check 908 whether there are any SSIDs on the primary scan list. If not, nothing further need be changed, and the flow returns to step 904. If so, the processor 410 accesses the periodic check element 461 to determine 910 whether it is time to perform a periodic SSID check. If not, the flow returns to step 904. If so, the processor 410 accesses the test frequency baud rate detection element 462 to perform 912 baud rate detection on the channels corresponding to all SSIDs on the primary scan list.

The processor 410 then checks 914 whether the correct baud rate was found on any of the channels. If not, the flow returns to step 904. If so, the processor 410 then accesses the zone identifier decoder element 463 to decode 916 the received SSID. The processor then accesses the zone identifier match element 464 to determine 918 whether the received SSID matches the corresponding SSID on the primary scan list. If not, the flow returns to step 904. If so, the flow returns to step 902 for moving the SSID and channel frequency to the top of the primary scan list and locking the communication receiver 400 thereto.

It should be appreciated by now that the present invention provides a method and apparatus that delivers efficient channel selection in a roaming communication receiver. Channel scanning in the communication receiver in accordance with the present invention advantageously is performed intelligently, such that the channels most likely to contain a message for the communication receiver are scanned before less likely channels. As an advantageous result, scanning time is minimized, while receiver battery life is maximized.

It should be understood that although the invention has been described in connection with a particular signaling protocol, the invention is useful in connection with any synchronous signaling protocol.

The above description is intended by way of example only and is not intended to limit the present invention in any way except as set forth in the following claims.

What is claimed is:

1. A method for selecting a receive frequency in a communication receiver operating in a communication system having a plurality of coverage areas, a coverage area accommodating a transmission of messages to the communication receiver, wherein the coverage area is divided into a plurality of zones, the method comprising the steps of:

storing in the communication receiver a primary scan list having a top and a bottom and containing coverage area identification parameters, the primary scan list initially ordered from a most frequented coverage area at the top to a least frequented coverage area at the bottom, the parameters including at least one of a coverage area identifier for identifying a coverage area and a zone identifier for identifying a zone within a corresponding coverage area, and at least one corresponding frequency identifier for identifying the receive frequency on which the communication receiver can receive message information in the corresponding coverage area;

choosing from the primary scan list a frequency identifier corresponding to the most frequented coverage area;

tuning the communication receiver to the receive frequency identified by the frequency identifier and thereafter performing baud rate detection on a signal received on the receive frequency, wherein, in response to finding a baud rate matching one of at least one predetermined baud rate, the method further comprises the steps of:

decoding, from the signal received, at least one of a received coverage area identifier and a received zone identifier in an attempt to find a coverage area match by determining that the at least one of the received coverage area identifier and the received zone identifier matches one of the corresponding coverage area identification parameters stored in the communication receiver; and locking the communication receiver to the signal on the receive frequency in response to finding the coverage area match.

2. The method of claim 1, further comprising the steps of:

selecting from the primary scan list a next frequency identifier, in response to not finding the baud rate matching the one of the at least one predetermined baud rate in the performing step;

thereafter repeating the tuning, performing, decoding and locking steps, redoing the selecting and repeating steps for a first predetermined time in response to the coverage area match not being found; and terminating the selecting and repeating steps in response to the coverage area match being found and the communication receiver being locked to the signal.

3. The method of claim 2, wherein, the method further comprises the steps of:

determining whether to perform a random search for a coverage area identifier, in response to the selecting and repeating steps having been redone for the predetermined time; and forming, in response to a determination that the random search is to be performed, a candidate channel list by adding frequencies to the candidate channel list that are different from those identified by any frequency identifiers of the primary scan list and that are determined to have signal energy at the baud rate matching the one of the at least one predetermined baud rate.

4. The method of claim 3, wherein the step of determining whether to perform the random search for a coverage area identifier comprises the steps of:

prompting a user of the communication receiver that the communication receiver is unable to match the coverage area identification parameters on the primary scan list; and determining that the random search is to be performed, in response to an absence of a predetermined control sequence by the user within a second predetermined time.

5. The method of claim 3, wherein the forming step comprises the steps of:

checking whether the communication receiver has been synchronized earlier with time information derived from protocol frames transmitted by the communication system;

adjusting, in response to the communication receiver having been synchronized earlier with the time information, a roaming time window in accordance with a product of a predetermined timer inaccuracy per unit of time and an elapsed time since the communication receiver was last synchronized with the time information, thereby forming an adjusted roaming time window; and thereafter determining from the adjusted roaming time window and current time indicated by a timer in the communication receiver whether it is time for mandatory roaming information to be transmitted.

6. The method of claim 3, wherein the forming step comprises the steps of:

tuning the communication receiver to a channel frequency that has been added to the candidate channel list;

decoding roaming information carried on the channel frequency; and removing the channel frequency from the candidate channel list in response to finding from the roaming information that the channel frequency does not carry messages for roaming traffic.

7. The method of claim 6, wherein the forming step further comprises the step of:

resynchronizing the communication receiver with time information derived from protocol frames transmitted on the channel frequency, in response to finding from the roaming information that the channel frequency carries messages for roaming traffic.

8. The method of claim 6, wherein the forming step further comprises the step of:

decoding a candidate coverage area identifier received on the channel frequency;

comparing the candidate coverage area identifier with all coverage area identifiers included in the primary scan list; and placing the candidate coverage area identifier and a frequency identifier identifying the channel frequency at the top of the primary scan list, and locking the communication receiver to the channel frequency, in response to the candidate coverage area identifier matching one of the coverage area identifiers included in the primary scan list.

9. The method of claim 1, further comprising the steps of:

determining, in response to locking onto the signal, whether a zone identifier match was responsible for locking the communication receiver;

determining whether any zone identifiers are included on the primary scan list, in response to determining that a zone identifier match was not responsible for locking the communication receiver;

thereafter determining whether a time for a periodic check of zone identifiers has arrived, in response to determining that at least one zone identifier is included on the primary scan list; and thereafter performing baud rate detection on test frequencies corresponding to each zone identifier included on the primary scan list, in response to determining that the time for the periodic check of zone identifiers has arrived.

10. The method of claim 9, further comprising the steps of:

decoding the zone identifier received on a test frequency, in response to finding the baud rate matching the one of the at least one predetermined baud rate on the test frequency;

thereafter determining whether the zone identifier received matches the zone identifier on the primary scan list that corresponds to the test frequency;

moving the zone identifier and the corresponding frequency identifier to the top of the primary scan list, in response to the zone identifier received matching the zone identifier on the primary scan list that corresponds to the test frequency; and thereafter locking the communication receiver to the test frequency.

11. A communication receiver operating in a communication system having a plurality of coverage areas, a coverage area accommodating a transmission of messages to the communication receiver, wherein the coverage area is divided into a plurality of zones, the communication receiver for selecting a receive frequency and comprising:

a receiver element for receiving the messages;

a processor coupled to the receiver element for controlling the communication receiver and for decoding the messages;

a timer coupled to the processor for indicating time of day;

a memory coupled to the processor for storing in the communication receiver a primary scan list having a top and a bottom and containing coverage area identification parameters, the primary scan list initially ordered from a most frequented coverage area at the top to a least frequented coverage area at the bottom, the parameters including at least one of a coverage area identifier for identifying a coverage area and a zone identifier for identifying a zone within a corresponding coverage area, and at least one corresponding frequency identifier for identifying the receive frequency on which the communication receiver can receive message information in the corresponding coverage area;

a read only memory coupled to the processor, comprising;

an initialization element for controlling said processor to perform a choosing from the primary scan list of a frequency identifier corresponding to the most frequented coverage area;

a first tuner element for controlling said processor to perform a tuning of the communication receiver to the receive frequency identified by the frequency identifier;

a baud rate detection element for controlling said processor to perform a baud rate detection on a signal received on the receive frequency;

a parameter decoder element for controlling said processor to perform a decoding from the signal received, in response to finding a baud rate matching one of at least one predetermined baud rate, of at least one of a received coverage area identifier and a received zone identifier in an attempt to find a coverage area match by determining that the at least one of the received coverage area identifier and the received zone identifier matches one of the corresponding coverage area identification parameters stored in the communication receiver; and a first lock element for controlling said processor to perform a locking of the communication receiver to the signal on the receive frequency, in response to finding the coverage area match.

12. The communication receiver of claim 11, comprising:

a selector element for controlling said processor to perform a selection from the primary scan list of a next frequency identifier, in response to the baud rate detection resulting in a finding that the baud rate does not match the one of the at least one predetermined baud rate;

a repeat element for controlling said processor to perform a repetition of the tuning, baud rate detection, decoding and locking responsive to the receive frequency corresponding to the next frequency identifier;

a redo element for controlling said processor to perform a redoing of the selection and repetition for a first predetermined time in response to the coverage area match not being found; and a terminator element for controlling said processor to perform a termination of the selection and repetition in response to the coverage area match being found and the communication receiver being locked to the signal.

13. The communication receiver of claim 12, further comprising:

a random search determiner element for controlling said processor to perform a determination whether to perform a random search for a coverage area identifier, in response to the selection and repetition having been redone for the predetermined time; and a candidate channel list form element for controlling said processor to perform a formation, in response to the random search determiner element determining that the random search is to be performed, of a candidate channel list by adding frequencies to the candidate channel list that are different from those identified by any frequency identifiers of the primary scan list and that are determined to have signal energy at the baud rate matching the one of the at least one predetermined baud rate.

14. The communication receiver of claim 13, further comprising a display, wherein the random search determiner element comprises:

a prompter element for controlling said processor to perform a prompting of a user of the communication receiver that the communication receiver is unable to match the coverage area identification parameters on the primary scan list, by sending an appropriate message to the display; and a control responder element for controlling said processor to perform a determination that the random search is to be performed, in response to an absence of a predetermined control sequence by the user within a second predetermined time.

15. The communication receiver of claim 13, wherein the candidate channel list form element comprises:

a time synchronization checker element for controlling said processor to perform a check whether the communication receiver has been synchronized earlier with time information derived from protocol frames transmitted by the communication system;

a window adjustment element for controlling said processor to perform an adjustment, in response to the communication receiver having been synchronized earlier with the time information, of a roaming time window in accordance with a product of a predetermined timer inaccuracy per unit of time and an elapsed time since the communication receiver was last synchronized with the time information, thereby forming an adjusted roaming time window; and a roaming information determiner element for controlling said processor to perform a determination from the adjusted roaming time window and current time indicated by the timer in the communication receiver whether it is time for mandatory roaming information to be transmitted.

16. The communication receiver of claim 13, wherein the candidate channel list form element comprises:

a second tuner element for controlling said processor to perform a tuning of the communication receiver to a channel frequency that has been added to the candidate channel list;

a roaming information decoder element for controlling said processor to perform a decoding of roaming information carried on the channel frequency; and a channel frequency removal element for controlling said processor to perform a removal of the channel frequency from the candidate channel list in response to finding from the roaming information that the channel frequency does not carry messages for roaming traffic.

17. The communication receiver of claim 16, wherein the candidate channel list form element further comprises:

a resynchronization element for controlling said processor to perform resynchronization of the communication receiver with time information derived from protocol frames transmitted on the channel frequency, in response to finding from the roaming information that the channel frequency carries messages for roaming traffic.

18. The communication receiver of claim 16, wherein the candidate channel list form element further comprises:

a coverage area identifier decoder element for controlling said processor to perform a decoding of a candidate coverage area identifier received on the channel frequency;

a comparator element for controlling said processor to perform a comparison of the candidate coverage area identifier with all coverage area identifiers included in the primary scan list; and a placement element for controlling said processor to perform to place the candidate coverage area identifier and a frequency identifier identifying the channel frequency at the top of the primary scan list, and to lock the communication receiver to the channel frequency, in response to the comparison showing that the candidate coverage area identifier matches one of the coverage area identifiers included in the primary scan list.

19. The communication receiver of claim 11, further comprising:

a zone identifier lock element for controlling said processor to perform a first determination, in response to locking onto the signal, whether a zone identifier match was responsible for locking the communication receiver;

a zone identifier availability element for controlling said processor to perform a second determination whether any zone identifiers are included on the primary scan list, in response to the first determination being that a zone identifier match was not responsible for locking the communication receiver;

a periodic check element for controlling said processor to perform a third determination whether a time for a periodic check of zone identifiers has arrived, in response to the second determination being that at least one zone identifier is included on the primary scan list; and a test frequency baud rate detection element for controlling said processor to perform a baud rate detection on test frequencies corresponding to each zone identifier included on the primary scan list, in response to the third determination being that the time for the periodic check of zone identifiers has arrived.

20. The communication receiver of claim 19, further comprising:

a zone identifier decoder element for controlling said processor to perform a decoding of the zone identifier received on a test frequency, in response to the test frequency baud rate detection resulting in a finding that the baud rate matches the one of the at least one predetermined baud rate on the test frequency;

a zone identifier match element for controlling said processor to perform a fourth determination whether the zone identifier received matches the zone identifier on the primary scan list that corresponds to the test frequency;

a mover element for controlling said processor to perform a movement of the zone identifier and the corresponding frequency identifier to the top of the primary scan list, in response to the fourth determination being that the zone identifier received matches the zone identifier on the primary scan list that corresponds to the test frequency; and a second lock element for controlling said processor to perform a locking of the communication receiver to the test frequency.

* * * * *